F. P. PFLEGHAR.
Holdback.

No. 209,190.　　　　　　　　Patented Oct. 22, 1878.

Witnesses　　　　　　　　　　Inventor.
W. H. Harris.　　　　　　　　Frank P. Pfleghar
William F. Hopson　　　　　by George Terry
　　　　　　　　　　　　　　Atty

UNITED STATES PATENT OFFICE.

FRANK P. PFLEGHAR, OF NEW HAVEN, CONNECTICUT.

IMPROVEMENT IN HOLDBACKS.

Specification forming part of Letters Patent No. 209,190, dated October 22, 1878; application filed April 22, 1878.

*To all whom it may concern:*

Be it known that I, FRANK P. PFLEGHAR, of New Haven, county of New Haven and State of Connecticut, have invented certain new and useful Improvements relating to Holdbacks for Carriages, of which the following is a specification:

My invention relates to holdbacks made in two parts; and consists in the novel construction and combination of the parts which are hereinafter more fully set forth and claimed.

Figure 1:
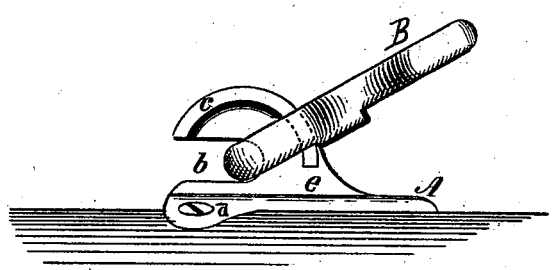
Figure 2:
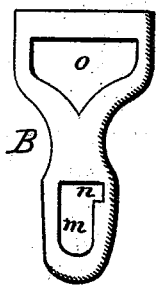
Figure 3:
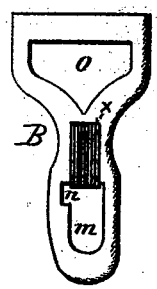

Figure 1 is a view of the holdback attached to a section of a thill. Fig. 2 is a view of the front side of the part attached to the harness, and Fig. 3 is a view of the opposite side.

The piece or hook A, Fig. 1, is made with the base $a$, the under side of which is curved to fit the thill, and with the nearly semicircular upright part $e$, on the side of which is formed the curved flange $c$. Into this upright part $e$ the slot $b$ is made wide enough to admit the slotted end of the part B, the inner end of the slot being rounded. The outer edge of the part $e$, as far as the flange extends, and the flange $c$ are circular, the center of the circular parts being in a central line through the slot $b$ at a distance from its inner end equal to half the width of the slot.

The part B, Fig. 2, is made with the loop $o$, through which the holdback-strap of the harness passes, and with the slot $m$, having the lateral enlargement $n$. It is also made with a cavity or recess, into which the piece of rubber $x$, Fig. 3, is inserted, the rubber extending a short distance into the slot $m$.

Having described the parts of my holdback, they are put together and used in the following manner: The part B being brought nearly in line with the slot $b$, the slotted end is passed into the slot $b$, and the part is then slightly pressed backward to compress the rubber and turned to the position shown in Fig. 1. The rubber prevents rattling, and the flange $c$, fitting into the lateral enlargement $n$ of the slot $m$, prevents the separation of the parts except when the part B is in line or nearly in line with the slot $b$.

Having described my invention and the mode of its operation, what I claim as new, and desire to secure by Letters Patent, is—

1. The hook A, consisting of the base $a$ and upright part $e$, having slot $b$, and curved flange $c$, in combination with piece B, having loop $o$, slot $m$, its lateral enlargement $n$, and rubber $x$, as shown and set forth.

2. In a holdback, the hook A, consisting of the base $a$ and upright part $e$, having slot $b$, and curved flange $c$, as set forth.

3. In a holdback, the piece B, having loop $o$, slot $m$, its lateral enlargement $n$, and rubber $x$, as set forth.

FRANK P. PFLEGHAR.

Witness:
GEORGE TERRY,
WILLIAM F. HOPSON.